United States Patent [19]
Nakagomi

[11] Patent Number: 5,105,555
[45] Date of Patent: Apr. 21, 1992

[54] PLASTIC DRYING APPARATUS

[76] Inventor: Shoji Nakagomi, 518-1, Shirakuwa, Urawa-shi, Saitama, Japan

[21] Appl. No.: 608,071

[22] Filed: Nov. 1, 1990

[30] Foreign Application Priority Data

| Jan. 11, 1990 | [JP] | Japan | 2-4350 |
| Feb. 28, 1990 | [JP] | Japan | 2-49067 |
| Apr. 16, 1990 | [JP] | Japan | 2-99570 |
| Apr. 23, 1990 | [JP] | Japan | 2-106885 |

[51] Int. Cl.⁵ .................................................. F26B 3/34
[52] U.S. Cl. ....................................... 34/1 V; 34/1 P; 34/17; 34/68
[58] Field of Search .................... 34/1 V, 17, 68, 48, 34/46, 181, 179

[56] References Cited

U.S. PATENT DOCUMENTS

| 2,916,831 | 12/1959 | McCosh | 34/68 |
| 3,152,872 | 10/1964 | Scoggin et al. | 34/17 |
| 3,277,580 | 10/1966 | Tooby | 34/1 |
| 3,327,401 | 6/1967 | Stamos et al. | 34/17 |
| 3,555,693 | 1/1971 | Futer | 34/1 |
| 3,834,038 | 9/1974 | Janda | 34/1 |
| 4,023,279 | 5/1977 | Janda | 34/1 |
| 4,043,050 | 8/1977 | Hancock | 34/1 |
| 4,055,001 | 10/1977 | Forster et al. | 34/1 |
| 4,103,431 | 8/1978 | Levinson | 34/1 |
| 4,173,608 | 11/1979 | Soulier | 34/1 |

Primary Examiner—Henry A. Bennet
Assistant Examiner—Denise L. F. Gromada
Attorney, Agent, or Firm—Jordan and Hamburg

[57] ABSTRACT

A plastic drying apparatus that uses microwave heating as means of heating a plastic thereby allowing the surface as well as the inside of particles of the plastic to be heated simultaneously and therefore can attain to bring the plastic to a highly dried state within a short period of time. A certain amount of a plastic is fed into a plastic drying tank. While the plastic is stirred, the plastic is heated and dried uniformly by microwaves generated by a microwave generating unit. The humidity is measured by a humidity measuring sensor and the plastic is highly dried automatically. Dried air nozzles are provided to the wall surface of the plastic drying tank for discharging air in a super-dried state in a widely flared manner so as to prevent the plastic powder, etc. from adhering.

5 Claims, 5 Drawing Sheets

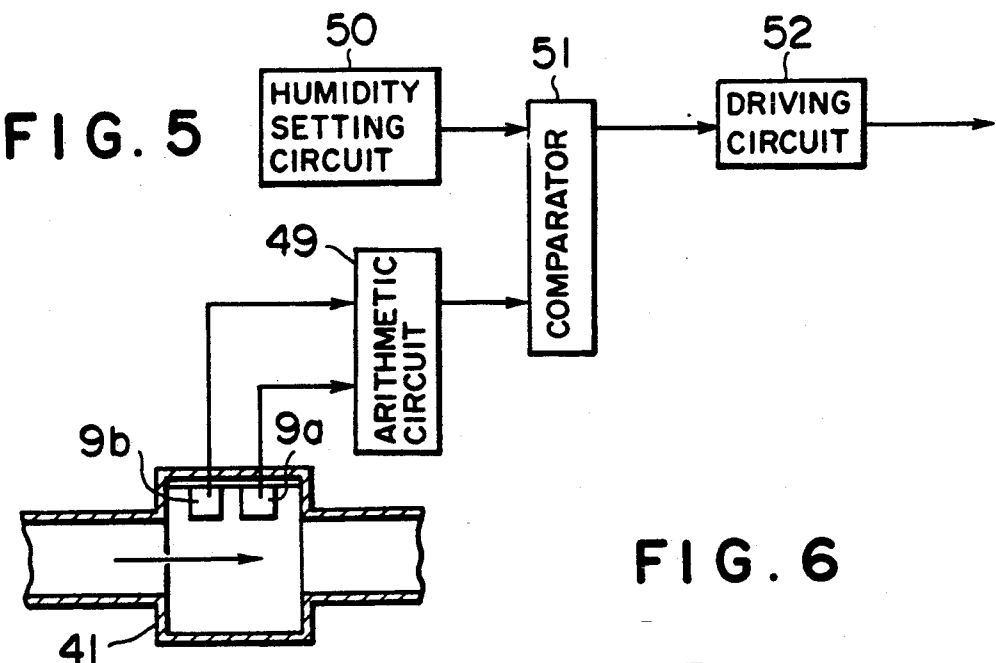
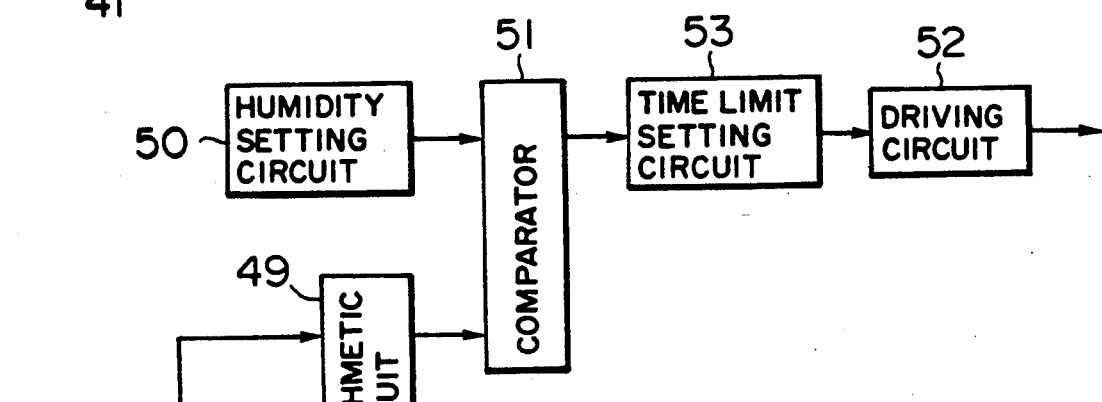
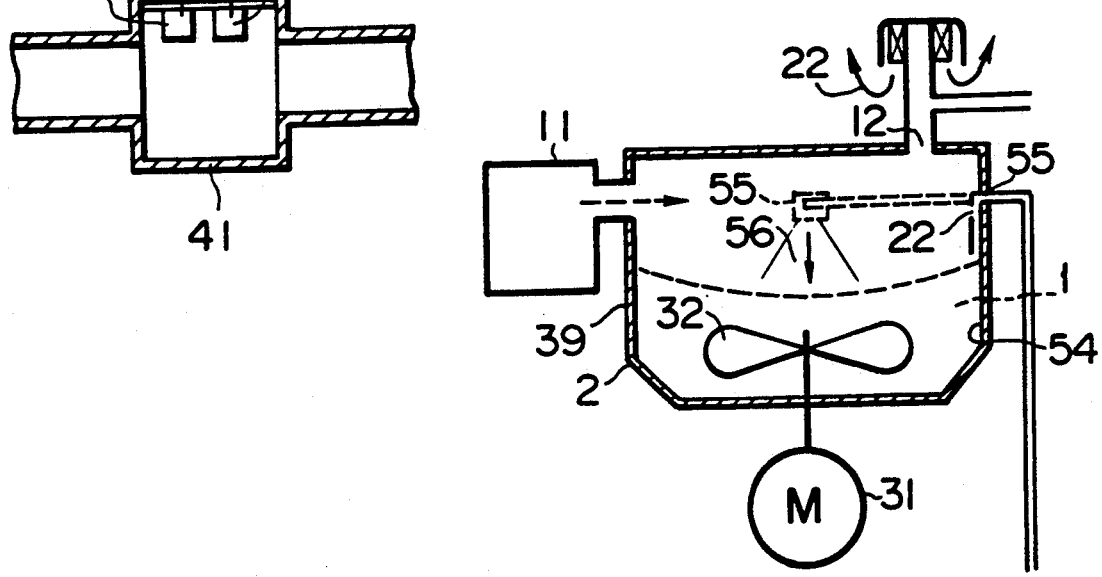

PLASTIC DRYING APPARATUS

FIELD OF THE INVENTION

The present invention relates to a plastic drying apparatus and, more particularly, to a plastic drying apparatus for bringing a plastic used for injection molding, extrusion molding, etc. rapidly to a highly dried state.

DESCRIPTION OF THE PRIOR ART

Conventionally, as plastic drying apparatuses, those are generally used which have as means of heating and drying a plastic a dehumidifying drier that heats dried atmosphere and delivers it to a plastic drying tank. The dehumidifying drier heats and dries the plastic by a hot blast. In order to release moisture contained in the plastic by heating, first air is heated and is then sent around the plastic. Thus, the plastic is heated by the air around the plastic and at the same time the moisture in the plastic is heated, pressurized and released. Since the air for heating the plastic has a low heat conductivity and is used by blowing, the air for heating the plastic must be heated in a volume tens to hundreds times as large as the volume of the plastic. Since the heat conductivity of plastics is as low as that of heat insulating materials, the efficiency of the heat exchange is very low, the drying of the plastic starts from the surface of its particles by the hot blast and therefore it takes long time to remove the moisture completely. Accordingly it has been difficult to bring the plastic to a highly dried state and therefore the automatic drying apparatus is incomplete naturally. The control of the humidity by the prior hygrometer is carried out mainly by human work in such a manner that air in a high-temperature highly dried state is continuously blown into the plastic drying tank for a period which seemed to secure the drying on the basis of the experience. That is, even if the plastic consists of the same material, the state of the material wherein the water content is high, for example, because the material is a virgin material, or a ground material, or because of the conditions under which the material is kept must be considered. Therefore the prior art is uneconomical and took much time. Further, the measurement of the water content of a plastic only by a hygrometer involves many unstable factors including the temperature condition and the state of the flow of air and is only a guide.

SUMMARY OF THE INVENTION

A major object of the present invention is to provide a plastic drying apparatus that uses microwave heating as means of heating a plastic thereby allowing the surface as well as the inside of particles of the plastic to be heated simultaneously and therefore can attain to bring the plastic to a highly dried state within a short period of time.

An important object of the present invention is to provide a plastic drying apparatus that can knead and dry uniformly a plastic of powdery particles when the plastic is heated by a hot blast or microwave energy.

Another object of the present invention is to provide a plastic drying apparatus that can measure stably the water absorption of a plastic charged into a stirring tank in a certain quantity irrespective of a difference in its temperature by detecting the absolute humidity of the air in an exhaust path that has passed through the plastic.

A still another object of the present invention is to provide a plastic drying apparatus that can make the whole mass of a plastic uniform by air curtains generated by dried air nozzles to blow the plastic that adheres to the inner wall of a drying tank or rests on settling parts outside the driving region of stirring blades to bring it back into whirls of the stirred plastic.

According to a first embodiment, a plastic drying apparatus for drying highly a plastic automatically by feeding a certain quantity of a plastic into a plastic drying tank and measuring the humidity by a humidity measuring sensor is provided, which plastic drying apparatus comprises a plastic drying tank for heating and drying the plastic by microwaves generated by a microwave generating unit, a stirring means for stirring the plastic in the plastic drying tank so that the plastic may be heated uniformly, a metering loader for metering and feeding each predetermined batch of the plastic into the plastic drying tank, a sub-tank for keeping temporarily the dried plastic, a plastic supply unit for supplying the plastic kept in said sub-tank from the metering loader into the plastic drying tank to bring the quantity of the plastic in the plastic drying tank to a prescribed amount in the case when the amount of the plastic fed to the plastic drying tank is short of the prescribed amount, a flow rate adjusting unit for setting constant the dried air to be fed to the plastic drying tank, a dried air generating unit for generating dried air to be fed to the flow rate adjusting unit and the sub-tank, a humidity measuring sensor for measuring the humidity of the air discharged from the plastic drying tank, and a control circuit to which the measured value of the humidity measuring sensor is inputted and that operates programs on the basis of previously set data to set a time limit and drives the microwave generating unit, the stirring means, etc.

In this constitution of the first embodiment, a certain amount of a plastic is metered and fed by the metering loader into the plastic drying tank and dry air dried by the dried air generating unit is fed into the plastic drying tank at a certain flow rate through the flow rate adjusting unit. By making constant the amount of the plastic in the plastic drying tank and the supply of the dried air to be fed into the plastic drying tank and by stirring uniformly the plastic in the plastic drying tank by the stirring means, the water content of the plastic can be measured indirectly from the humidity in the air discharged. In the control circuit, a time limit is set in accordance with the humidity of the air discharged from the plastic drying tank and measured by the humidity measuring sensor, and the control circuit drives the stirring means, the microwave generating unit for irradiating the plastic with microwaves to heat the plastic, etc. so that the plastic is brought to a prescribed highly dried state. The sub-tank keeps the plastic temporarily and feeds the plastic to the plastic drying tank through a plastic supply means when the quantity of the plastic to be fed into the plastic drying tank comes short of a prescribed amount.

According to a second embodiment, a plastic drying apparatus of the present invention wherein a plastic charged into a drying tank is stirred uniformly so that the plastic may be heated uniformly by a hot blast or microwaves is provided, which plastic drying apparatus comprises a bearing section that is fixed to the center of the bottom of the cylindrical drying tank into which the plastic will be charged, the top of the bearing section being formed to project from the plastic, a rotating shaft that is rotated about the axis of the bearing section, one end of the rotating shaft in the drying tank being projected beyond the top of the bearing section and being provided with stirring blades, a cover in the shape of a circular cone or a pyramid provided to the one end of said rotating shaft for covering the top of the bearing section, and a motor fixed to the bottom on the outside of the drying tank for driving the rotating shaft. Alternatively the plastic drying apparatus may comprise a bearing section that is fixed to the center of the bottom of the cylindrical drying tank into which the plastic will be charged, the top of the bearing section being formed to project from the plastic, a rotating shaft that is rotated about the axis of the bearing section, one end of the rotating shaft in the drying tank being projected beyond the top of the bearing section and being provided with stirring blades, a cover in the shape of a circular cone or a pyramid provided to the one end of said rotating shaft for covering the top of the bearing section, a motor fixed to the bottom on the outside of the drying tank for driving the rotating shaft, and one or more dried air blowoff units for blowing down the dried air along the wall surface of the drying tank.

In this constitution of the second embodiment, the stirring blades are moved, together with the rotating shaft, relatively between the wall surface of the drying tank and the bearing shaft, there are generated a force approximately turned in the plastic by the stirring blades and a force resting the plastic due to the frictional force along the circumferential wall surface and the bearing section, the plastic performs different complicated kneading movements in positions of the particles, and a hot blast or microwave energy heats and dries the plastic in the drying tank uniformly.

According to a third embodiment of the present invention, a plastic drying apparatus of the present invention wherein the time when a plastic is brought to a prescribed dried state is detected and a drying apparatus is stopped, which plastic drying apparatus comprises a stirring means for heating and drying, a dried air feeding means including a pressure adjusting unit for adjusting the pressure of air sent out from a compressor, a dryer for bringing air discharged from a flow rate adjusting unit to a highly dried state, and a flow rate adjusting unit for sending the air in the highly dried state discharged from the dryer to a stirring tank at a certain flow rate, a discharge port provided at an upper part of the stirring tank for keeping the pressure in the stirring tank constant, an exhaust path for constant exhaust located near the exhaust port, and a plastic drying control means connected to leads or output terminals of a temperature sensor and a humidity sensor provided in the exhaust path for calculating the absolute humidity and controlling the plastic drying apparatus.

The plastic drying control means comprises an arithmetic circuit connected to the lead terminals or output terminals of the temperature sensor and the humidity sensor for calculating the absolute humidity, a humidity setting circuit whose output signal level can be arbitrarily set, a comparator which compares the output signal of the humidity setting circuit with the output signal of the comparator and operates by detecting the case when the output signal of the humidity setting circuit has become larger or smaller in level than the output signal of the arithmetic circuit, and a driving circuit that is turned on or off by receiving the operation signal of the comparator.

In this constitution of the third embodiment, a certain amount of a moist plastic is charged into the stirring tank, where it is heated and stirred. The heated and stirred plastic heats the moisture contained therein and its evaporation takes place correspondingly to the water content. By passing air in a highly dried state through the plastic in the stirring tank at a certain pressure and a certain flow rate, the air will contain moisture corresponding to the water content of the plastic, that is, will have an absolute humidity. The dried air feeding means dries the air compressed by the compressor and sends the dried air into the stirring tank at a certain pressure and a certain flow rate. The exhaust port removes the air to stabilize the pressure in the stirring tank and acts with the dried air feeding means to make the flow of the air in the stirring tank have a stabilized pressure. Small part of the air thus having a stabilized pressure and flow is sucked from the stirring tank at a certain flow rate by a suction pump. Therefore, the absolute humidity of the air passing through the exhaust path corresponds to the water content of the plastic stirred uniformly in the stirring tank. Then, by providing a temperature sensor and a humidity sensor on the exhaust path, the temperature and the absolute humidity of the air can be measured. The measurement values of the temperature sensor and the humidity sensor are inputted into the dried air control means, where the absolute humidity is calculated and the time is detected when the absolute humidity has reached a prescribed absolute humidity to stop the drying operation of the plastic in the stirring tank, so that the plastic is made ready for injection molding or extrusion molding.

According to a fourth embodiment of the present invention, an air type wiping means is provided for preventing a plastic powder or the like from adhering to the wall surface of the plastic drying tank of the plastic drying apparatus of the present invention, which air type wiping means comprises a dried air generating unit for sending air into the drying tank where the plastic is heated and stirred and dried air nozzles provided at upper part of the wall surface of the drying tank for discharging the air in a super-dried state generated by the dried air generating unit along the inner wall of the drying tank in a widely flared manner. The dried air nozzles may be arranged at upper part of the wall surface of the plastic drying tank to discharge the dried air along the inner wall downward slantly in a widely flared manner.

In this constitution of the fourth embodiment, by discharging and blowing down the dried air from the dried air nozzles along the inner wall of the dried tank in a widely flared manner, the plastic adhering to the inner wall is blown, and the flows of the air along the inner wall form air curtains of compressed air layers to prevent the powdery plastic from adhering. The air in a super-dried state discharged from the dried air nozzles forms air curtains widely along the inner wall, so that the air is discharged in a widely flared manner. By directing downward slantly the discharge direction of the air in a super-dried state discharged from the dried air nozzles, the areas of the air curtains can be made large. In this manner, the plastic in the drying tank can be heated and dried uniformly.

BRIEF DESCRIPTION OF THE DRAWINGS

FIG. 5 is a first block diagram of the plastic drying control means shown in FIG. 3.

FIG. 6 is a second block diagram of the plastic drying control means shown in FIG. 3.

FIG. 7 is a diagram illustrating a plastic drying tank equipped with an air type wiping means showing a fourth embodiment according to the present invention.

DESCRIPTION OF THE PREFERRED EMBODIMENTS

Now embodiments of the present invention will be described with reference to the drawings.

Figure 1:
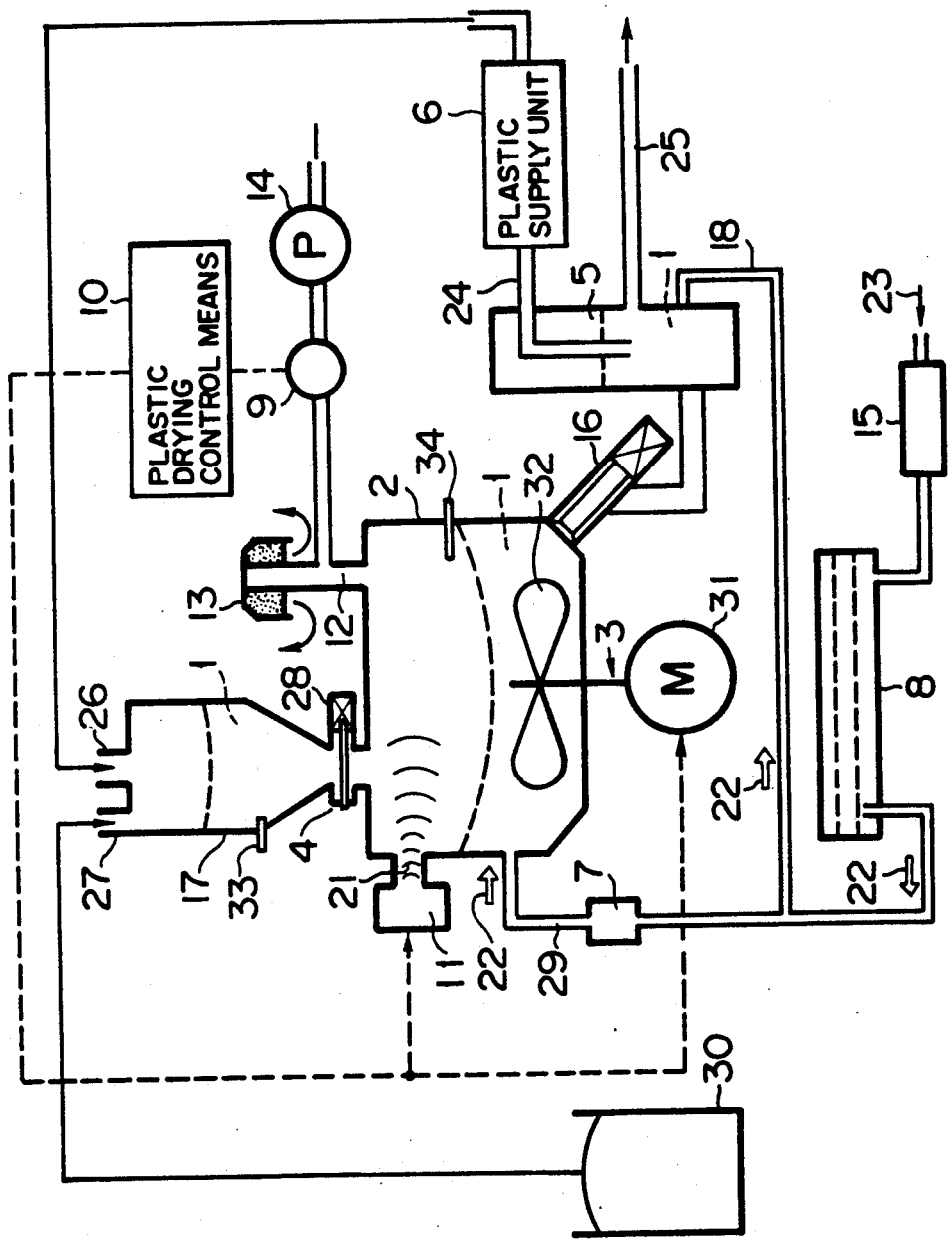
FIG. 1 is a flow sheet illustrating a plastic drying apparatus showing a first embodiment according to the present invention.

FIG. 1 is a flow sheet illustrating a plastic drying apparatus showing a first embodiment according to the present invention. In the drawing, reference numeral 1 indicates a plastic in the form of pellets, for example, of nylon, polypropylene, or polyethylene terephthalate, which will be used as material for extrusion molding or injection molding. The plastic 1 is fed into a plastic drying tank 2 from a dryer hopper 17 through a metering loader 4 in such a manner that each batch consists of a certain amount thereof. The metering loader 4 is composed of the dryer hopper 17 in which the plastic 1 is prepared and stored, a shutter 28, and a hoper level sensor 33 provided to the plastic drying tank 2 and supplies the plastic 1 into the plastic drying tank 2 by opening the shutter 28 when the hopper level sensor 33 detects the upper limit of the plastic 1. The plastic drying tank 2 is provided with, in addition to the metering loader 4 and the dryer hopper 17, a stirring means 3, a microwave generating unit 11, an exhaust port 12, a drying tank side discharge port 29 for dried air 22, and a discharge gate 16. The stirring means 3 is made up of a motor 31 that is attached outside of the plastic drying tank 2 and stirring blades 32 that are located in the plastic drying tank 2 and are driven by the motor 31 to stir the plastic 1 uniformly. Therefore, even although microwaves 21 are high in directivity, the temperature of the plastic 1 in the large plastic drying tank 2 is elevated uniformly. The microwave generating unit 11 consists of a magnetron for generating microwaves 21, a transmitting antenna for transmitting the microwaves 21, and a waveguide for guiding the microwaves 21 into the plastic drying tank 2, which are not shown, and the molecules constituting the plastic 1 irradiated with the microwaves 21 are caused to rotate and vibrate, so that heat is generated inside and outside the molecules due to the frictional heat between the molecules and the plastic 1 is dried in a short period of time. The drying tank side discharge port 29 serves as an inflow port for allowing the dried air 22 that has been compressed and dried through a compressor 15 that takes in air 23 and a dried air generating unit 8 to be flowed into the plastic drying tank 2 with the flow rate of dried air 22 being kept constant by a flow rate adjusting unit 7 and the dried air 22 catches the moisture evaporated from the plastic 1 in the plastic drying tank 2 and is discharged from the exhaust port 12. The air discharged from the exhaust port 12 is released into the atmosphere through a filter 13. Part of the air discharged from the exhaust port 12 is sucked by a suction pump 14 and its humidity is measured by a humidity measuring sensor 9. The discharge gate 16 sends the plastic 1 brought to a prescribed highly dried state into a sub-tank 5. The discharge gate 16 may be driven by a motor, an air cylinder, or the like. The sub-tank 5 holds temporarily the plastic 1 dried in the plastic drying tank 2, and air-delivers the plastic 1 from a molder side outlet 25 toward a hopper of a molder, and also air-delivers the dried plastic 1 to a supply side inlet 26 from a supply side outlet 24 through a plastic supply unit 6 when the plastic 1 to be fed to the dryer hopper 17 from a plastic raw material tank 30 through a feeding side inlet 27 becomes short and the plastic 1 to be loaded into the plastic drying tank 2 comes short of a prescribed quantity. Reference numeral 18 indicates a sub-tank side discharge outlet through which the dried air 22 is fed to the sub-tank 5 which prevents the plastic 1 from reabsorbing moisture and also serves as a delivering air when air-delivering is effected. A plastic supply unit 6 supplies the plastic 1 from the sub-tank 5 to the drier hopper 17 by feedback and stops when the hopper level sensor 33 provided to the drier hopper 17 detects the upper limit of the supply of the plastic 1. The drying tank level sensor 34 provided to the plastic drying tank 2 is a sensor for detecting the plastic 1 of one batch and detects the upper limit of the plastic 1 thereby closing the shutter 28 to stop the supply of the plastic 1. The humidity of the air discharged from the exhaust port 12 measured by the humidity measuring sensor 9 indicates indirectly the water content of the plastic drying tank 2 as described above. The humidity measuring sensor 9 takes the dew point temperature of the air discharged from the exhaust port 12, the dew point sensor for measuring the water content of the plastic 1 comprises an absolute humidity sensor or the like consisting of a humidity sensor and a temperature sensor enclosed in a dry gas, and the time limit of the output of the humidity measuring sensor 9 is set by a plastic drying control means 10 that operates programs on the basis of previously inputted data. Time t timed by the plastic drying control means 10 drives the stirring means 3, the microwave generating unit 11, etc. to bring the plastic 1 to a prescribed highly dried state, so that the plastic 1 is not hydrolyzed when it is molded thereby allowing the molding to be done highly accurately.

Figure 2:
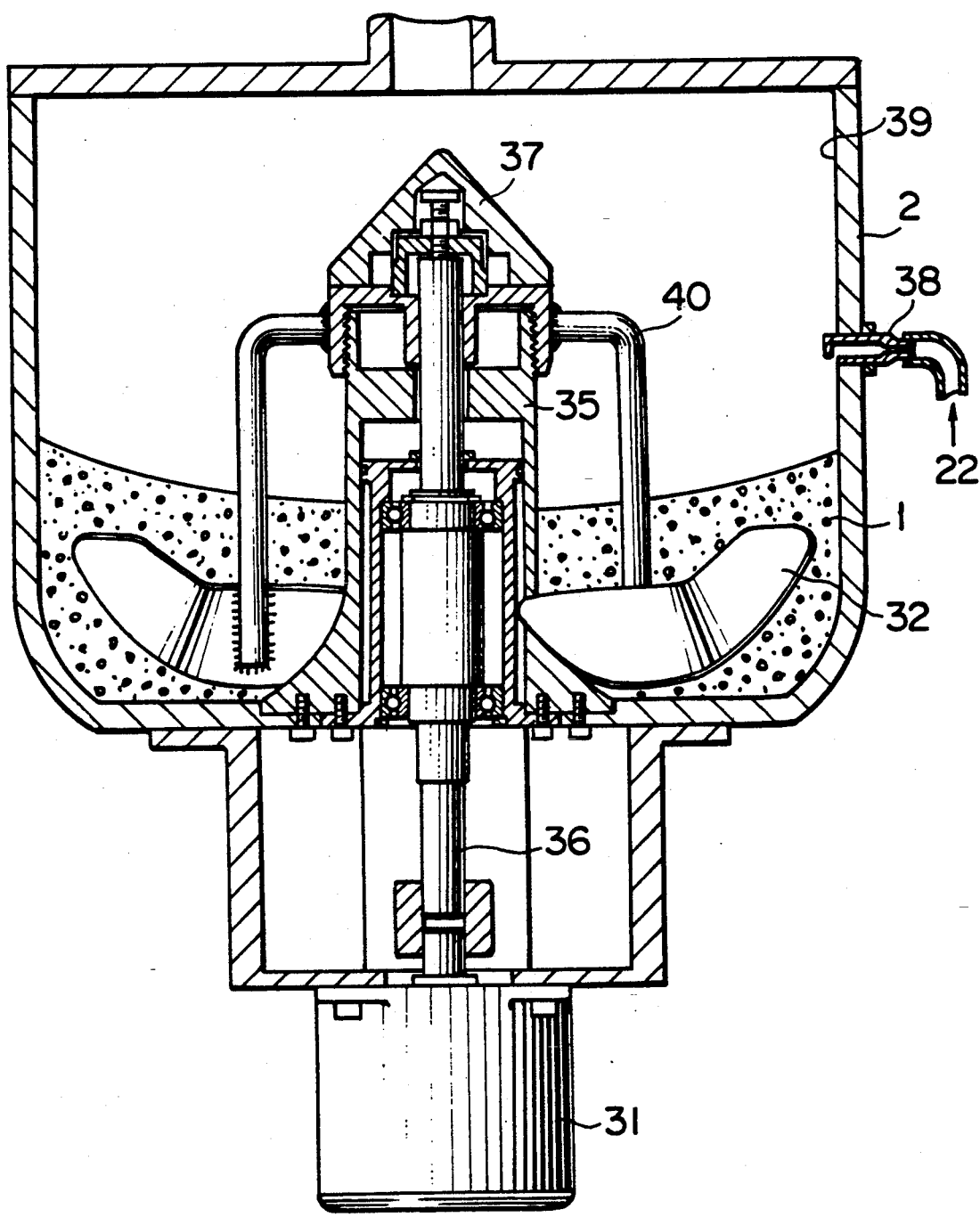
FIG. 2 is a diagram illustrating a stirring means showing a second embodiment according to the present invention.

FIG. 2 is a diagram illustrating a stirring means showing a second embodiment of the present invention. Reference numeral 1 indicates a plastic in the form of powdery particles. Reference numeral 2 indicates a drying tank 2 in the shape of a cylinder for stirring the plastic 1 and a bearing section 35 is integrally fixed to the drying tank 2 coaxially therewith. The bearing section 35 projects into the central part in the drying tank 2 and is formed not to be buried in the plastic 1. Reference numeral 36 indicates a rotating shaft powered by a motor 31 to be rotated with it borne by the bearing section 35 and the rotating shaft 36 is provided with stirring blades 32 through fixed arms 40 at the upper end thereof. The stirring blades 32 are rotated and moved relatively between a wall surface 39 formed on the cylinder inner surface of the drying tank 2 and the bearing section 35 to stir the plastic 1. The plastic 1 is kneaded uniformly by the rotation of the stirring blades 32 and the stirring action caused by the difference of the circumferential speed of the stirring blades 32 and the difference of the relative speed between the bearing section 35 and the wall surface 39. Reference numeral 37 indicates a cover that is placed on the upper end of the bearing section 35 and is in the shape of a circular cone or a pyramid and the cover 37 prevents the plastic 1 from piling up and being heated locally when the plastic 1 is kneaded or charged into the drying tank 2. One or more dried air blowoff units 38 cause the dried air 22 to flow down along the wall surface 39 and form a film of dried air on the wall surface 39 which prevents the plastic 1 from being charged with electricity and adhering to the wall surface 39 in the course of the drying.

Figure 3:
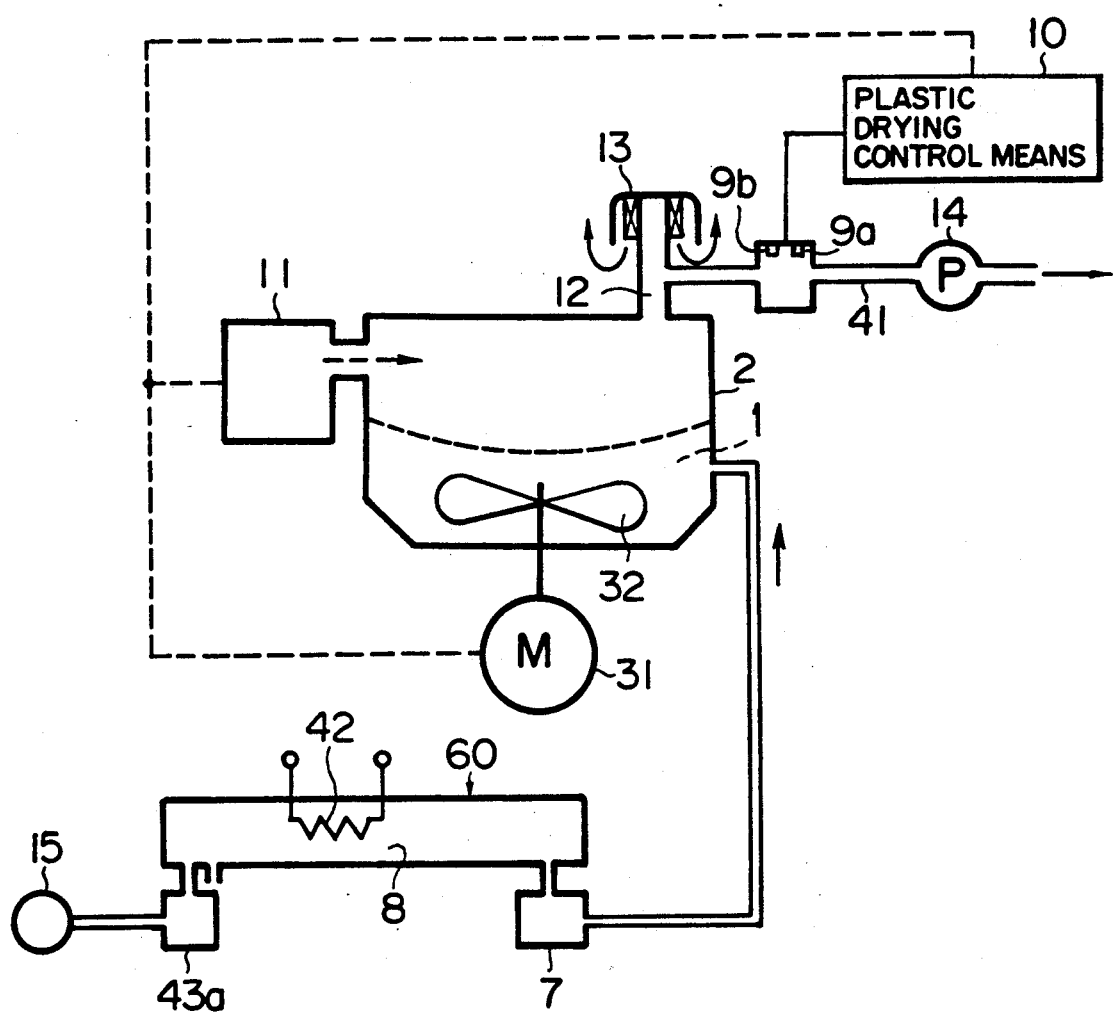
FIG. 3 is a diagram illustrating a plastic drying control means showing a third embodiment according to the invention.
Figure 4A:
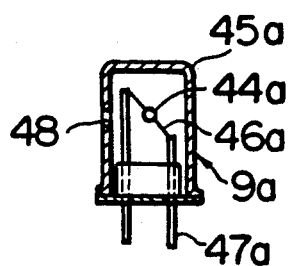
FIG. 4 is diagrams of embodiments of sensors of the plastic drying control means shown in FIG. 3.
Figure 4B:
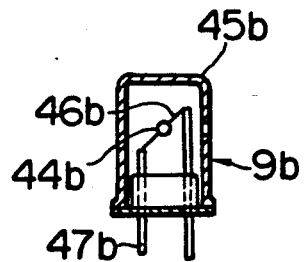

FIG. 3 is a diagram illustrating a plastic drying apparatus showing a plastic drying control means for plastic which is a third embodiment of the present invention. Reference numeral 1 indicates a plastic in the form of a powder. A metered certain amount of the plastic 1 is charged into a drying tank 2, where the plastic 1 is stirred uniformly by stirring blades 32 driven by a motor 31 provided to the drying tank 2. At the same time, the plastic 1 is heated and dried directly by a microwave generating unit 11 provided to the drying tank 2 or indirectly with highly dried air heated by a heater 42 provided in a dried air generating unit 8. In FIG. 3, although both the microwave generating unit 11 and the heater 42 are shown, it is possible if there is only one of them. A compressor 15 is an apparatus for supplying air into the drying tank 2 by first feeding air to a dried air feed means 60 where the air is brought to a highly dried state and then the dried air is fed into the drying tank 2 with the pressure and the flow rate of the dried air kept constant. The dried air feed means 60 consists of a pressure adjusting unit 43 for keeping the pressure of the air from the compressor 15 constant and a flow rate adjusting unit 7 for feeding the air in a highly dried state to the drying tank 2 at a certain flow rate through the dried air generating unit 8 that brings the air fed from the pressure adjusting unit 43 to a highly dried state. An exhaust port 12 is provided to an upper part of the drying tank 2, so that the air in the drying tank 2 is removed to stabilize the pressure in the drying tank 2. The air flows from the dried air feed means 60 through the drying tank 2 into the exhaust port 12. Thus, since the air feed to and the air removal from the drying tank 2 are stabilized, the pressure and the flow rate of the air in the drying tank 2 are stabilized as well. Since evaporation from the plastic 1 uniformly stirred and heated in the drying tank 2 takes place in conformity with the moisture content of the plastic 1, the absolute humidity of the air discharged from the exhaust port 12 shows a value corresponding to the moisture content of the plastic 1. An exhaust path 41 is provided adjacent to the exhaust port 12, and through it the air in the drying tank 2 may be released into the atmosphere, for example, little by little so that the flow of the air in the drying tank 2 may not change, or may be removed at a constant flow rate by providing a suction pump 14 to the terminal of the exhaust path 41 as shown in FIG. 3. It is assumed that the air removed from the exhaust path 41 is the same as the air removed from the exhaust port 12, and the absolute humidity of the air from the exhaust path 41 indicates a value corresponding to the moisture content of the plastic in the drying tank 2. A temperature sensor 9b and a humidity sensor 9a are arranged in the exhaust path 41 with them integrated or separated adjacently thereby measuring the temperature and the humidity of the air passing through the exhaust path 41. The data of the measurements at the temperature sensor 9b and the humidity sensor 9a are inputted in a plastic drying control means 10 where the absolute humidity is measured and an arbitrary humidity is measured to stop the operation of the apparatus needed for the drying including the microwave generating unit 11, the heater 42, and the motor 31. FIG. 4 is diagrams of embodiments of the sensors used in the present invention: FIG. 4a shows the humidity sensor 9a and FIG. 4b shows the temperature sensor 9b.

The humidity sensor 9a is formed with a thermistor bead 44a housed in a case 45a and the thermistor bead 44a is connected to a pair of terminals 47a through lead wires 46a of platinum. The thermistor bead 44a comprises an electronic part whose resistance value changes linearly in accordance with temperature such as a posistor. The case 45a has a vent hole 48 so that the humidity outside the case 45a may be the same as that inside the case 45a. The temperature sensor 9b has a structure approximately similar to that of the humidity sensor 9a but does not have the vent hole 48 in the case 45a so as to cut the gas passage to and from the outside atmosphere and an inert gas or air in a highly dried state is confined in the case 45b so that the temperature of the air in a constant and highly dried state all the time may be measured. A variety types of humidity sensors and temperature sensors are on the market and as the humidity sensor 9a and the temperature sensor 9b used in the present invention any ones can be used if they carry out the measurement electrically, and a dew sensor also operates similarly in principle.

FIG. 5 is a first block diagram illustrating a control circuit for the present plastic drying control means. The terminals 47a and 47b of the humidity sensor 9a and the temperature sensor 9b provided in the exhaust path 41 are connected to an arithmetic circuit 49 forming a bridge circuit to output a signal corresponding to an absolute humidity.

Reference numeral 50 indicates a humidity setting circuit where an arbitrary humidity is set, which is inputted together with the output of the arithmetic circuit 49 to a comparator 51. The comparator 51 detects that the output of the arithmetic circuit 49 corresponding to the absolute humidity has become smaller or larger than the output corresponding to the set humidity of the humidity setting circuit 50 and generates an output signal, which is inputted to a driving circuit 52 for driving the microwave generating unit 11, the heater 42, the motor 31, etc. shown in FIG. 3. When the absolute humidity has become lower than the set humidity, the apparatus for heating and stirring the plastic 1 including the microwave generating unit 11, the heater 42, the motor 31, etc. is stopped through the output of the driving circuit 52. Therefore, when the output of the arithmetic circuit 49 is larger or smaller in level than the output of the humidity setting circuit 50, the measures can be taken in accordance with the operation conditions of the comparator 51 and the driving circuit 52 located downstream thereof, and it is enough to keep in mind that the operation may be regulated only by the results. It is also possible that the driving circuit 52 uses a circuit employing a PNP transistor or NPN transistor, thyristor, GTO, etc. to allow the output signal of the comparator 51 to become a pulse signal. FIG. 6 is a second block diagram of the control circuit for the present plastic drying apparatus. In FIG. 6., after a certain period of time after receiving the output signal of the comparator 51, the time limit setting circuit 53 generates a continuous signal or a pulse signal and by the operation of the time limit setting circuit 53, the driving circuit 52 is turned on or off.

FIG. 7 is a diagram illustrating a plastic drying tank showing a fourth embodiment of the present invention. The dried air nozzles 55 discharge the air 22 toward the inner wall 54 of the drying tank 2 in a widely flared manner.

Figure 8:
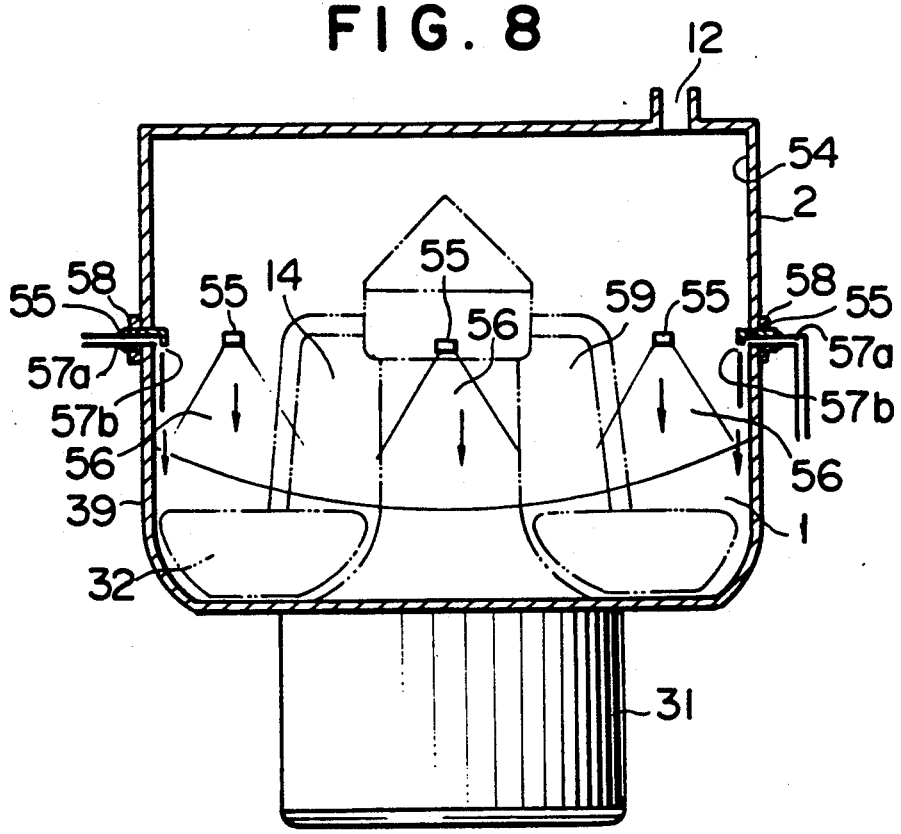
FIG. 8 is a diagram illustrating a first blowing-down state made by dried air nozzles of the plastic drying tank equipped with the air type wiping means shown in FIG. 7.
Figure 9:
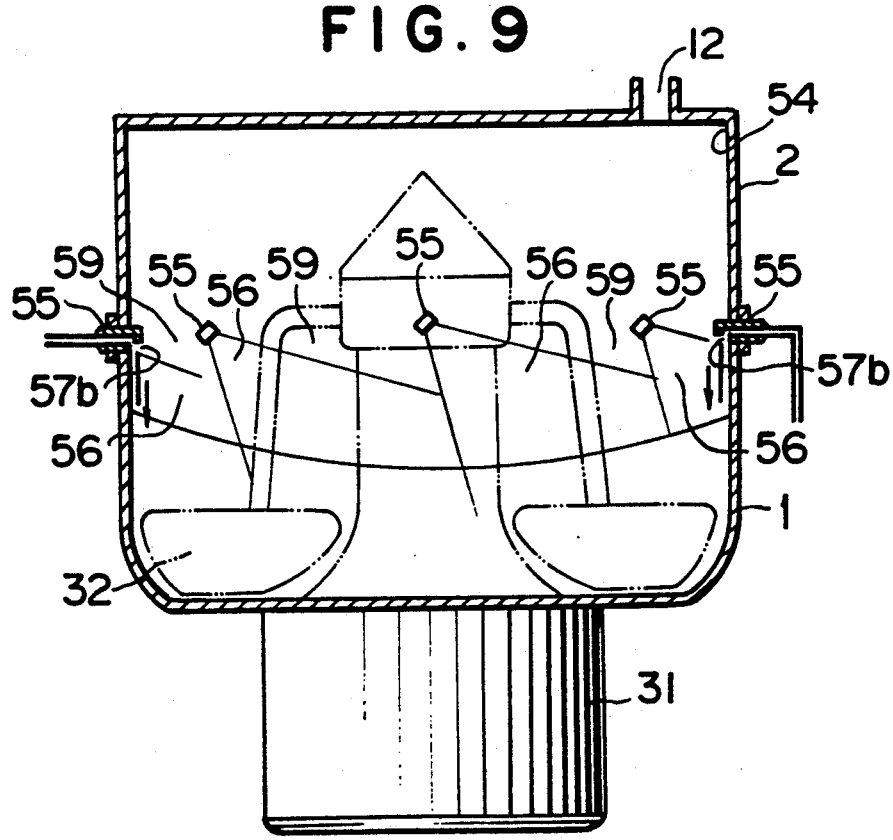
FIG. 9 is a diagram illustrating a second blowing-down state made by dried air nozzles of the plastic drying apparatus equipped with the air type wiping means shown in FIG. 7.

FIG. 8 is a diagram illustrating a first blowing-down state made by dried air nozzles 55 of the drying tank 2 equipped with the air type wiping means showing the fourth embodiment of the present invention. Each of the dried air nozzles 55 is made up of an air inflow port 57a located outside the drying tank 2, an air discharge port 57b located in the drying tank 2 for flowing down the air in a super-dried state flowed through the air inflow port 57a in such a manner that the air may be widely flared along the inner wall 54, and an attaching section 58 that is attached to the wall surface 39 by screws or the like. The air in a super-dried state discharged from the air discharge port 57b is blown directly downward along the inner wall 54 to form an air curtain 56. Each air curtain 56 is a layer of compressed air formed by the air in a super-dried state that flows in the state of widely spread thin film and acts to blow and scatter the plastic 1 that is floated lightly by stirring of the stirring blades 32 so that the plastic 1 may be prevented from collecting at parts where the plastic 1 is liable to stay or from adhering to the inner wall 54 due to the static electricity or the like. As a result, the plastic 1 can be prevented from staying on the surface of the inner wall 54. FIG. 9 is a diagram illustrating a second blowing-down state made by the dried air nozzle 55. In FIG. 9, the air in a super-dried state discharged from the air discharge ports 57b of the dried air nozzles 55 is blown downward slantly along the inner wall 54 to form each air curtain 56. Between the air curtains 56 is formed each air curtain-unformed section 59 in the shape of an inverted triangle. To reduce the area of the air curtain-unformed section 59, although it is of course considered to use many dried air nozzles 55, by blowing the curtain 56 downward slantly along the inner wall 54 as shown in FIG. 9, the area of each of the air curtain-unformed sections 59 between the air curtains 56 can be decreased. Therefore, it is not required to increase the number of the dried air nozzles 55 excessively.

What is claimed is:

1. A plastic drying apparatus comprising a cylindrical plastic drying tank for heating and drying a plastic by a plastic heating and drying means, a stirring means for stirring the plastic in said plastic drying tank so as to heat the plastic uniformly, said stirring means comprising a bearing section that is fixed to the center of the bottom of the cylindrical drying tank into which the plastic is charged, the top of the bearing section being formed to project from the plastic, a rotating shaft rotated about the axis of said bearing section, one end of the rotating shaft in said drying tank being projected beyond the top of said bearing section and being provided with stirring blades for stirring the plastic, a cover in the shape of a circular cone or a pyramid for allowing said one end of said rotating shaft to cover the top of said bearing section, a motor fixed to the bottom on the outside of said drying tank for drying said rotating shaft, a plastic supply unit for supplying the plastic to said plastic drying tank, a metering loader for metering and feeding each predetermined batch of the plastic from said plastic supply unit into said plastic drying tank to bring the amount of the plastic in said plastic drying tank to a prescribed amount, a sub-tank for keeping temporarily the dried plastic, a dried air generating unit for generating dried air and feeding said dried aid to said plastic drying tank and too said sub-tank, a flow rate adjusting unit for setting constant the dried air fed to said plastic drying tank, an exhaust path for removing air from said plastic drying tank, a temperature sensor and a humidity sensor in said exhaust path, said temperature sensor and said humidity sensor each having an output, and a plastic drying control means receiving the outputs of said temperature sensor and said humidity sensor and which is operable on the basis of previously set data to set a time limit to drive said heating and drying means and said stirring means.

2. A plastic drying apparatus as claimed in claim 1, wherein said heating and drying means comprises a microwave generating unit for generating microwaves.

3. A plastic drying apparatus comprising a plastic drying tank for heating and drying a plastic by a plastic heating and drying means, a stirring means for stirring the plastic in said plastic drying tank so as to heat the plastic uniformly, a plastic supply unit for supplying the plastic to said plastic drying tank, a metering loader for metering and feeding predetermined batches of the plastic from said plastic supply unit into said plastic drying tank to bring the amount of the plastic in said plastic drying tank to a prescribed amount, a sub-tank for keeping temporarily the dried plastic, a dried air generating unit for generating dried air and feeding said dried air to said plastic drying tank and to said sub-tank, a flow rate adjusting unit for setting constant the dried air fed to said plastic drying tank, an exhaust path for removing air from said plastic drying tank, a temperature sensor and a humidity sensor in said exhaust path, said temperature sensor and said humidity sensor each having an output, and a plastic drying control means receiving the outputs of said temperature sensor and said humidity sensor and which is operable on the basis of previously set data to set a time limit to drive said heating and drying means and said stirring means, said plastic drying control means comprising an arithmetic circuit that is connected to lead terminals of said temperature sensor and said humidity sensor to calculate absolute temperature, said arithmetic circuit having an output signal, a humidity setting circuit whose output signal level can be set arbitrarily, a comparator receiving the output signal of said arithmetic circuit and said humidity setting circuit and detecting when said output signal of said humidity setting circuit is larger or smaller than the output signal of said arithmetic circuit to thereby detect when the absolute humidity of the air in the air exhaust path has reached a prescribed dry state or less, and a driving circuit receiving an operation signal from said comparator such that when the comparator detects that the absolute humidity of the air in the exhaust path is at said prescribed dry state or less, the drying operation of the plastic drying apparatus is automatically stopped.

4. A plastic drying apparatus comprising a plastic drying tank for heating and drying a plastic by a plastic heating and drying means, air type wiping means for preventing the plastic powder from adhering to the wall surface of said plastic drying tank, a dried air generating apparatus, said air type wiping means comprising dried air nozzles provided on the wall surface of said plastic drying tank for discharging the air in a super-dried state generated by said dried air generating apparatus along the inner wall of said drying tank in a widely flared manner to form air curtains along the inner wall of the drying tank, a stirring means for stirring the plastic in said plastic drying tank so as to heat the plastic uniformly, a plastic supply unit for supplying the plastic to said plastic drying tank, a metering loader for metering and feeding predetermined batches of the plastic from said plastic supply unit into said plastic drying tank to bring the amount of the plastic in said plastic drying tank to a prescribed amount, a sub-tank for keeping temporarily the dried plastic, a dried air generating unit for generating dried air and feeding said dried air to said plastic drying tank and said sub-tank, a flow rate adjusting unit for setting constant the dried air fed to said plastic drying tank, an exhaust path for air to be removed from said plastic drying tank, a temperature sensor and a humidity sensor in said exhaust path, said temperature sensor and said humidity sensor each having an output, and a plastic drying control means receiving the outputs of said temperature sensor and said humidity sensor and which is operable on the basis of previously set data to set a time limit to drive said heating and drying means and said stirring means.

5. A plastic drying apparatus comprising a plastic drying tank for heating and drying a plastic by a plastic heating and drying means, air type wiping means for preventing the plastic powder from adhering to the wall surface of said plastic drying tank, said air type wiping means comprising dried air nozzles arranged at an upper part of the wall surface of the plastic drying tank for discharging the air along the inner surface of the plastic drying tank downward slantingly in a widely flared manner to form air curtains along the inner wall of said drying tank, a stirring means for stirring the plastic in said plastic drying tank so as to heat the plastic uniformly, a plastic supply unit for supplying the plastic to said plastic drying tank, a metering loader for metering and feeding predetermined batches of the plastic from said plastic supply unit into said plastic drying tank to bring the amount of plastic in said plastic drying tank to a prescribed amount, a sub-tank for keeping temporarily the dried plastic, a dried air generating unit for generating dried air and feeding said dried air to said plastic drying tank and to said sub-tank, a flow rate adjusting unit for setting constant the dried air fed to said plastic drying tank, an exhaust path for removing air from said plastic trying tank, a temperature sensor and a humidity sensor in said exhaust path, said temperature sensor and said humidity sensor each having an output, and a plastic drying control means receiving the outputs of said temperature sensor and said humidity sensor and which is operable on the basis of previously set data to set a time limit to drive said heating and drying means and said stirring means.

* * * * *